(12) United States Patent
Hoch et al.

(10) Patent No.: US 9,280,240 B2
(45) Date of Patent: Mar. 8, 2016

(54) SYSTEM AND METHOD FOR FINITE ELEMENT IMAGING SENSOR DEVICES

(71) Applicant: SYNAPTICS INCORPORATED, Santa Clara, CA (US)

(72) Inventors: David Hoch, Los Gatos, CA (US); Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 350 days.

(21) Appl. No.: 13/676,320

(22) Filed: Nov. 14, 2012

(65) Prior Publication Data

US 2014/0132552 A1 May 15, 2014

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/045* (2013.01); *G06F 3/0416* (2013.01)

(58) Field of Classification Search
None
See application file for complete search history.

(56) References Cited

U.S. PATENT DOCUMENTS

| 6,297,811 | B1 | 10/2001 | Kent et al. | |
|---|---|---|---|---|
| 7,952,567 | B2 * | 5/2011 | Aroyan et al. | 345/174 |
| 2002/0036621 | A1 * | 3/2002 | Liu et al. | 345/173 |
| 2010/0164889 | A1 | 7/2010 | Hristov et al. | |
| 2010/0302180 | A1 * | 12/2010 | Chang et al. | 345/173 |
| 2011/0050624 | A1 * | 3/2011 | Lee et al. | 345/174 |
| 2011/0062969 | A1 * | 3/2011 | Hargreaves et al. | 324/658 |
| 2011/0062971 | A1 * | 3/2011 | Badaye | 324/686 |
| 2011/0062974 | A1 * | 3/2011 | Day et al. | 324/713 |
| 2012/0001220 | A1 * | 1/2012 | Hiraiwa et al. | 257/98 |
| 2013/0030740 | A1 * | 1/2013 | Bulea | 702/65 |
| 2013/0304315 | A1 * | 11/2013 | Stoyanov et al. | 701/36 |

OTHER PUBLICATIONS

Mihai et al., "System and Method for Gradient Imaging Sensors", U.S. Appl. No. 13/489,774, filed Jun. 6, 2012.

* cited by examiner

*Primary Examiner* — Adam R Giesy
*Assistant Examiner* — Henok Heyi
(74) *Attorney, Agent, or Firm* — Osha Liang LLP

(57) ABSTRACT

A processing system includes a transmitter module, a receiver module, and a determination module. The transmitter module is configured to drive a first contact, a second contact, and a third contact of a first transmitter electrode, wherein the first contact is disposed between the second contact and the third contact. This produces a first voltage gradient between the first contact and the second contact, and produces a second voltage gradient between the first contact and the third contact. The receiver module receives, with a first receiver electrode, a first resulting signal including effects of the first voltage gradient, and to receive, with a second receiver electrode, a second resulting signal comprising effects of the second voltage gradient. The determination module determines positional information for an input object located within a sensing region based on the first resulting signal and the second resulting signal.

22 Claims, 12 Drawing Sheets

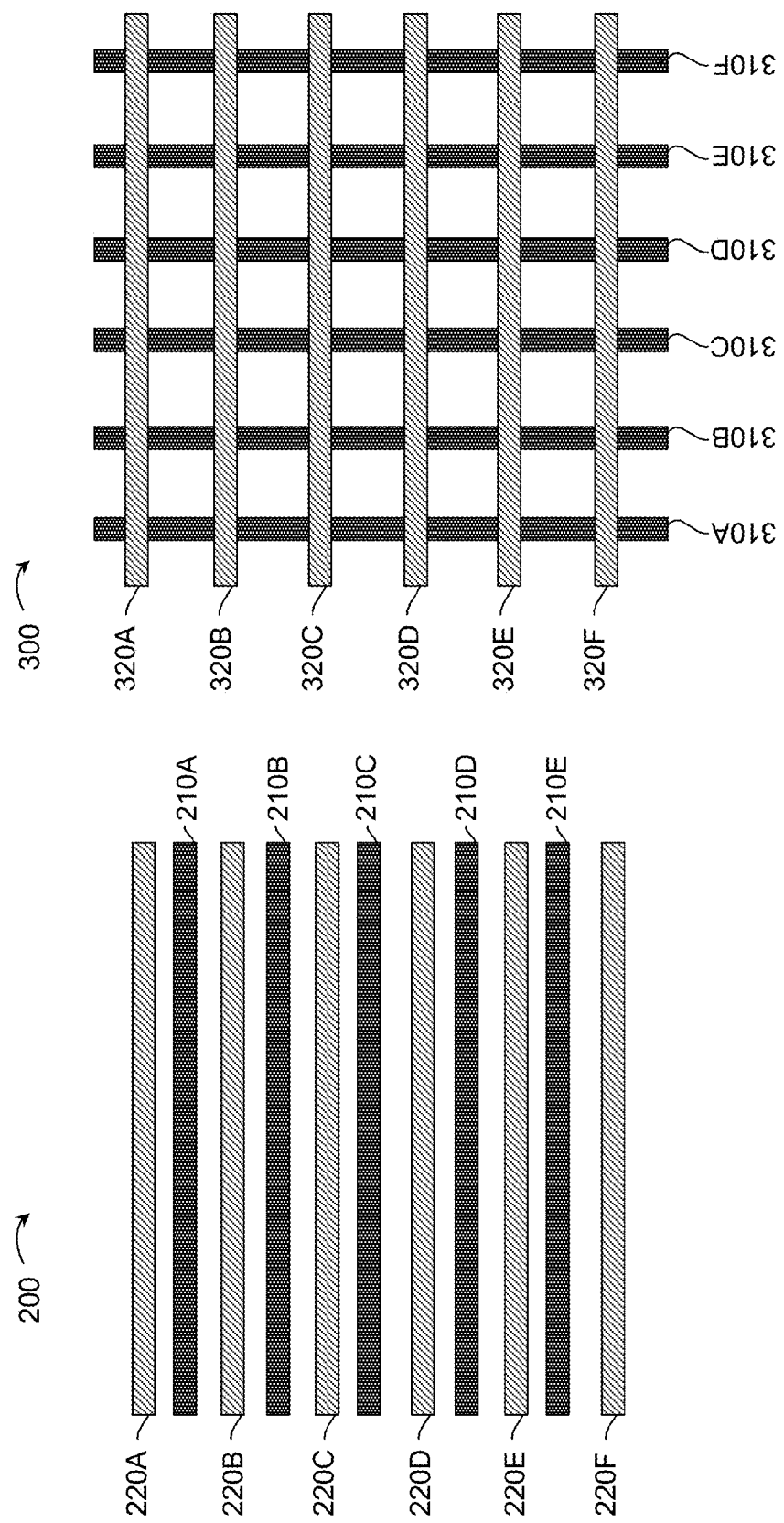

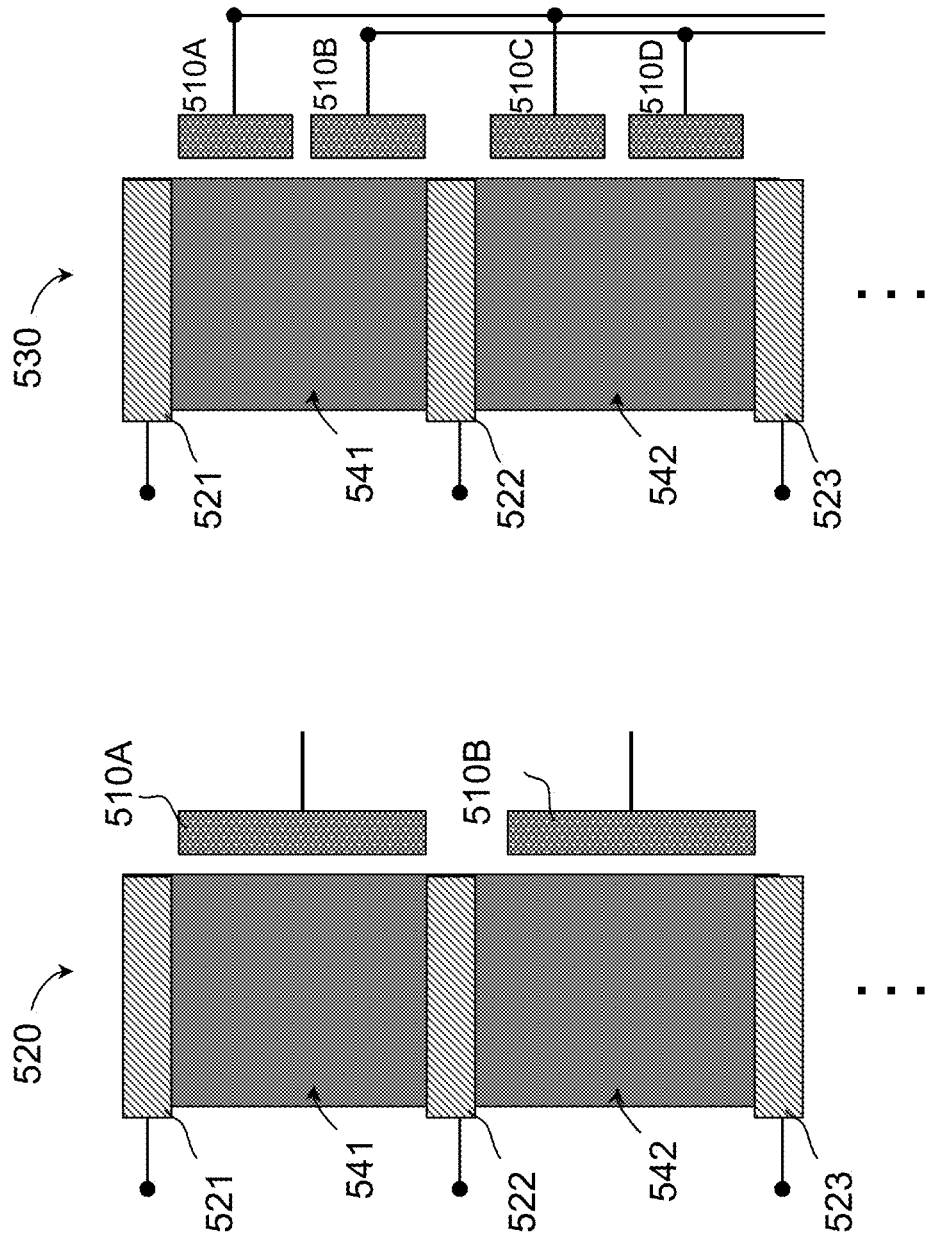

US 9,280,240 B2

SYSTEM AND METHOD FOR FINITE ELEMENT IMAGING SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

There continues to be a need for improved proximity sensor devices. For example, there remains a need for proximity sensor devices that reduce low-ground-mass effects, decrease scan times, increase positional accuracy, and/or exhibit improved robustness to noise sources.

BRIEF SUMMARY OF THE INVENTION

A processing system in accordance with one embodiment of the present invention includes a transmitter module, a receiver module, and a determination module. The transmitter module including transmitter circuitry and is configured to drive a first contact, a second contact, and a third contact of a first transmitter electrode, wherein the first contact is disposed between the second contact and the third contact, and the transmitter module is configured to produce a first voltage gradient between the first contact and the second contact, and to produce a second voltage gradient between the first contact and the third contact. The receiver module is configured to receive, with a first receiver electrode, a first resulting signal comprising effects of the first voltage gradient, and to receive, with a second receiver electrode, a second resulting signal comprising effects of the second voltage gradient. The determination module is configured to determine positional information for a first input object located within a sensing region based on the first resulting signal and the second resulting signal.

A finite element sensor device in accordance with one embodiment includes: a first transmitter electrode having a first contact, a second contact, and a third contact, wherein the first contact is disposed between the second contact and the third contact; a first receiver electrode and a second receiver electrode; and a processing system communicatively coupled to the first transmitter electrode and the first and second receiver electrodes. The processing system is configured to: drive the first contact, the second contact, and the third contact of the first transmitter electrode to produce a first voltage gradient between the first contact and the second contact and to produce a second voltage gradient between the first contact and the third contact; receive, with the first receiver electrode, a first resulting signal comprising effects of the first voltage gradient; receive, with the second receiver electrode, a second resulting signal comprising effects of the second voltage gradient; and determine positional information for a first input object located within a sensing region based on the first resulting signal and the second resulting signal.

A method of capacitive sensing in accordance with one embodiment comprises: driving a first contact, a second contact, and a third contact of a first transmitter electrode to produce a first voltage gradient between the first contact and the second contact and to produce a second voltage gradient between the first contact and the third contact; receiving, with a first receiver electrode, a first resulting signal comprising effects of the first voltage gradient; receiving, with a second receiver electrode, a second resulting signal comprising effects of the second voltage gradient; and determining positional information for a first input object located within a sensing region based on the first resulting signal and the second resulting signal.

BRIEF DESCRIPTION OF DRAWINGS

The present invention will hereinafter be described in conjunction with the appended drawings, where like designations denote like elements, and:

FIG. 2 is a conceptual block diagram depicting an example electrode pattern;

FIG. 3 is a conceptual block diagram depicting an example electrode pattern;

FIGS. 5A-5C are conceptual diagrams depicting sensor electrodes in accordance with various embodiments;

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Figure 1:
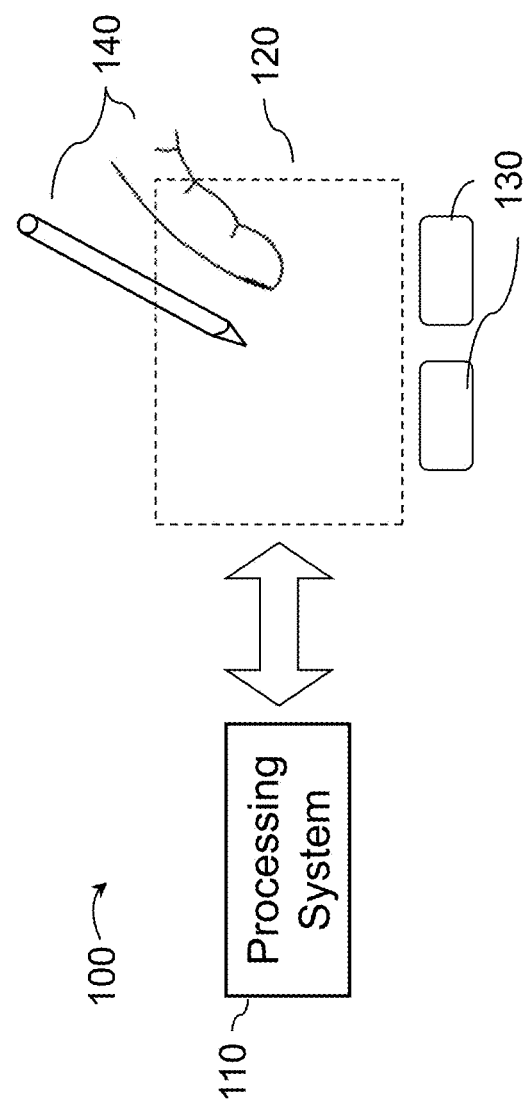
FIG. 1 is a block diagram of an example system that includes an input device in accordance with an embodiment of the invention.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

FIGS. 2 and 3 illustrate, conceptually, example sets of capacitive sensor electrodes 200 and 300 configured to sense in a sensing region. For clarity of illustration and description, FIG. 2 shows a pattern of sensor electrodes arranged substantially parallel to each other, and FIG. 3 shows a pattern of sensor electrodes arranged substantially perpendicular to each other. FIG. 2 and FIG. 3 illustrates two different forms of what may be referred to as a "gradient" sensors, in which a voltage variation is produced in the electrodes, as described in further detail below. The embodiment illustrated in FIG. 3 may further be referred to as what is often referred to as an "image" sensor, or a "gradient image sensor". It will be appreciated, however, that the invention is not so limited, and that a variety of electrode patterns and shapes may be suitable in any particular embodiment.

Sensor electrodes 210 and 220 of FIG. 2 are typically ohmically isolated from each other, as are sensor electrodes 310 and 320 of FIG. 3. In some embodiments, such sensor electrodes are separated from each by one or more substrates. For example, they may be disposed on opposite sides of the same substrate, or on different substrates that are laminated together.

In the embodiment depicted in FIG. 2, some sensor electrodes 210 (e.g., 210A, 210B, etc.) are configured as receiver electrodes, and some sensor electrodes 220 (e.g., 220A, 220B, etc.) are configured as transmitter electrodes. Similarly, in FIG. 3, some sensor electrodes 310 (e.g., 310A, 310B, etc.) are configured as receiver electrodes, and some sensor electrodes 320 (e.g., 320A, 320B, etc.) are configured as transmitter electrodes. The capacitive coupling between the transmitter electrodes and receiver electrodes change with the proximity and motion of input objects in the sensing region associated with the transmitter electrodes and receiver electrodes.

In each of the illustrated embodiments (as well as other example embodiments) the receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes 200 and 300 of FIGS. 2 and 3) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 4:
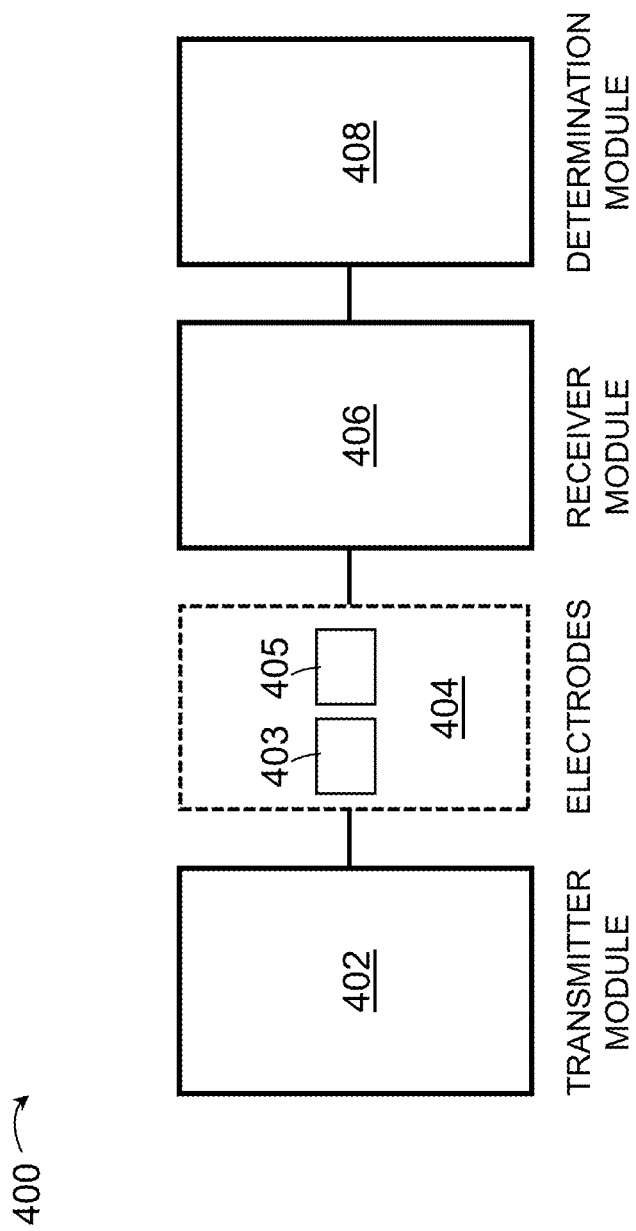
FIG. 4 is a conceptual diagram depicting an example processing system in accordance with the present invention.

Referring now to the conceptual block diagram depicted in FIG. 4, various embodiments of an example processing system 110 as shown in FIG. 1 may include a system 400. System 400, as illustrated, generally includes transmitter module 402, receiver module 406, and determination module 408. Transmitter module 402 is communicatively coupled via a set of sensor electrodes (or simply "sensor electrodes") 404 to receiver module 406, which itself is coupled to determination module 408. Sensor electrodes 404 include one or more transmitter electrodes 403 and one or more receiver electrodes 405.

In one embodiment, sensor electrodes 404 may be constructed from opaque or substantially opaque conductive materials. In other embodiments sensor electrodes 404 can be constructed from transparent or substantially transparent conductive material, such as patterned ITO, ATO, carbon fiber nanotubes, or other substantially transparent materials. In one embodiment, transmitter electrodes 403 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be implemented. In one embodiment, the voltage variations may be defined as the amount of change in voltage as a function of a small change in position along a transmitter electrode comprising resistive material.

Figure 5C:
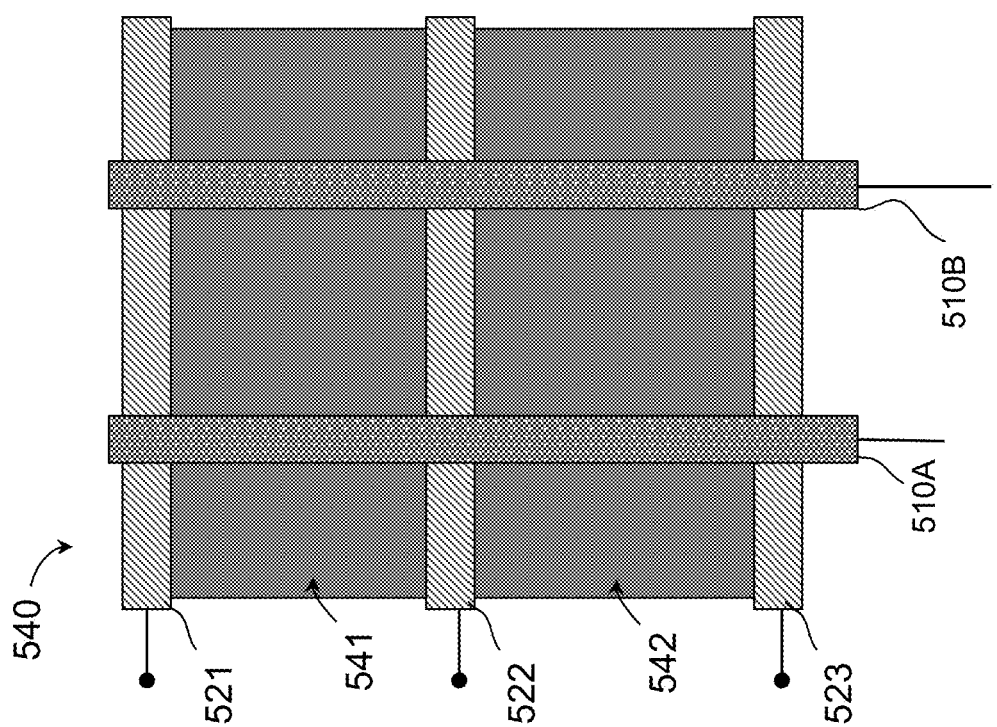

FIGS. 5A-5C are simplified, conceptual diagrams depicting example sensor electrode configurations. As shown, the sensor electrode configuration of FIG. 5A comprises a transmitter electrode 520 and two receiver electrode 510A and 510B. Transmitter electrode 520 includes at least three contacts: contact 521, contact 522, and contact 523, wherein contact 522 is disposed between contact 521 and 523. That is, assuming that transmitter electrode 520 has a "length" defined along the vertical direction of FIG. 5A, contacts 521, 522, and 523 are distributed along that length at irregular or regular intervals, separated by sensor electrode regions 541 and 542 as shown. In this embodiment, receiver electrode 510A spans the distance between contacts 521 and 522, and receiver electrode 510B spans the distance between contacts 522 and 523.

The sensor electrode configuration 530 of FIG. 5B depicts an alternate embodiment including four receiver electrodes: 510A, 510B, 510C, and 510D, wherein receiver electrodes 510A and 510C are coupled, and likewise receiver electrodes 510B and 510D are coupled. Thus, two receiver electrodes (510A and 510B) span the distance between contacts 521 and 522, and two receiver electrodes (510C and 510D) span the distance between contacts 522 and 523. The sensor electrode configuration 540 of FIG. 5C, in contrast, depicts an alternate embodiment in which two receiver electrodes 510A and 510B are used. In this embodiment, both receiver electrodes 510A and 510B span the distance between contacts 521 and 523.

The particular layout of sensor electrodes shown in FIGS. 5A-5C are not intended to be limiting, however, and is meant to be a conceptual rather than a strictly physical representation of an exemplary sensor electrode configuration. Similarly, while transmitter electrode 520 and receiver electrodes 510 are illustrated as generally rectangular and having a particular orientation with respect to each other, in practice sensor electrodes 520 and 510 may have a variety of shapes and orientations. In some embodiments, for example, transmitter electrode 520 comprises a plurality of segments or "strips Contacts 521, 522, and 523 provide electrical contact to transmitter electrode 520 in the conventional manner. In one embodiment, contacts 521, 522, and 523 each have a resistivity (i.e., a sheet resistance) that is much lower than the resistivity of transmitter electrode regions 541 and 542. In one embodiment, transmitter electrode regions 541 and 542 have a high resistivity, receiver electrode 510A and 510B have a low resistivity, and contact regions 521, 522, and 523 have a very low resistivity. In this regard, the meaning of "high", "low", and "very low" with respect to electrical resistivity in the context of the present invention will be understood by a person of ordinary skill in the art. In one embodiment, the contacts 521-523 are substantially transparent and have a resistivity that is substantially equal to zero (e.g., about 0.1 to 20 ohms/square) and may comprise a metal mesh structure. In one embodiment, electrode regions 541 and 542 comprise 200-500 ohms/square. In one embodiment, receiver electrodes 510 have a resistivity of 100-300 ohms/square. In other embodiments, receiver electrodes 510 have a resistivity that is less than 100 ohms/square.

Referring again to FIG. 4 in combination with FIG. 5A, in general, transmitter module 402 includes any combination of software and/or hardware (e.g., transmitter circuitry) configured to drive contacts 521, 522, and 523 of transmitter electrode 520 to produce a first voltage gradient between contact 522 and contact 521 (i.e., within transmitter electrode region 541), and to produce a second voltage gradient between contact 522 and contact 523 (i.e., within transmitter electrode region 542). In this regard, "driving" a signal with respect to a particular transmitter electrode or contact, as used herein, refers to imparting or otherwise causing a series of bursts, pulses or voltage transitions for a period of time.

Receiver module 406 includes any combination of software and/or hardware (e.g., receiver circuitry) configured to receive, with receiver electrode 510A, a first resulting signal comprising effects of the first voltage gradient (between contacts 522 and 521), and to receive, with receiver electrode 510B, a second resulting signal comprising effects of the second voltage gradient (between contacts 522 and 523).

Thus, transmitter electrode 520 and receiver electrode 510 together function as a form of gradient sensor. The term "gradient sensor" is used herein, without loss of generality, to refer to a sensor device employing one or more voltage gradients as described herein, wherein the appropriate combination of such gradients in space form what could be called local finite element basis functions.

Determination module 408 includes any combination of hardware and/or software configured to determine positional information for an input object located within a sensing region (e.g., an input object 140 within sensing region 120 of FIG. 1) based on the first resulting signal and the second resulting signal received by receiver module. In accordance with some embodiments, as described in further detail below, determination module 408 is configured to determine a two-dimensional capacitive image based on the first and second resulting signals.

In accordance with a further embodiment, transmitter module 402 is configured to drive contact 521 to produce a third voltage gradient between contact 521 and contact 523, and receiver module 406 is configured to receive, with receiver electrode 510A and/or receiver electrode 510B, a third resulting signal comprising effects of the third voltage gradient. In another embodiment, receiver module is configured to receive, with receiver electrode 510A and/or receiver electrode 510B, a fourth resulting signal comprising effects of the first voltage gradient. Determination module 408 then uses the available resulting signals (e.g., 2, 3, or 4 resulting signals) to determine the positional information.

Sensor devices in accordance with the present invention may be referred to herein as "finite element imaging" sensor devices based, for the most part, on parallels or analogs between finite element methods and the manner in which the described sensor devices operate. Such operation is described in further detail below. The term "finite element imaging" is not intended to be limiting, however.

As stated above, transmitter module 402 is configured to drive contacts 521, 522, and 523 of transmitter electrode 520 to produce two voltage gradients: one voltage gradient between contacts 522 and 521, and another voltage gradient between contacts 522 and contact 523. That is, when contacts 521, 522, and 523 are driven by respective drive signals (from transmitter module 402), a pair of voltage gradients are instantaneously produced across transmitter electrode 520 and change over time as the drive signals themselves change. In this regard, voltage gradients produced within transmitter electrode 520 at any particular time may be linear or non-linear.

As used herein with respect to voltage gradients produced between contacts 521, 522, and 523, the term "non-linear" refers to any category of curve that is not strictly linear (i.e., not characterized by a function of the form $y=mx+b$). For example, a non-linear voltage gradient might be a polynomial curve of degree greater than one (e.g., quadratic, cubic, etc.), a logarithmic curve, an exponential curve, or a trigonometric function (e.g., arctan, sin h, etc.). Voltage gradients may be continuous or discontinuous, and likewise may be differentiable (smooth) or non-differentiable. A voltage gradient may be a single function, or may consist of a plurality of piecewise segments.

FIGS. 6-11 are conceptual diagrams depicting electrode configurations in accordance with various embodiments. It will be appreciated that the embodiments shown in the figures are merely provided for the purpose of illustration and are not intended to limit the number, shape, and/or configuration of elements that might be appropriate for any given application. The terms "horizontal" and "vertical" are used without loss of generality to refer to orientations relative to the drawing sheets and solely to aid in understanding the figures. Furthermore, in the interest of simplicity some electrical connections to the transmitter electrodes and/or receiver electrodes in FIGS. 6-11 have not been illustrated. It will be understood, however, that connections to the transmitter electrodes will generally be made at their ends (e.g., on opposite ends) or at other points along the periphery of the transmitter electrodes.

Figure 6:
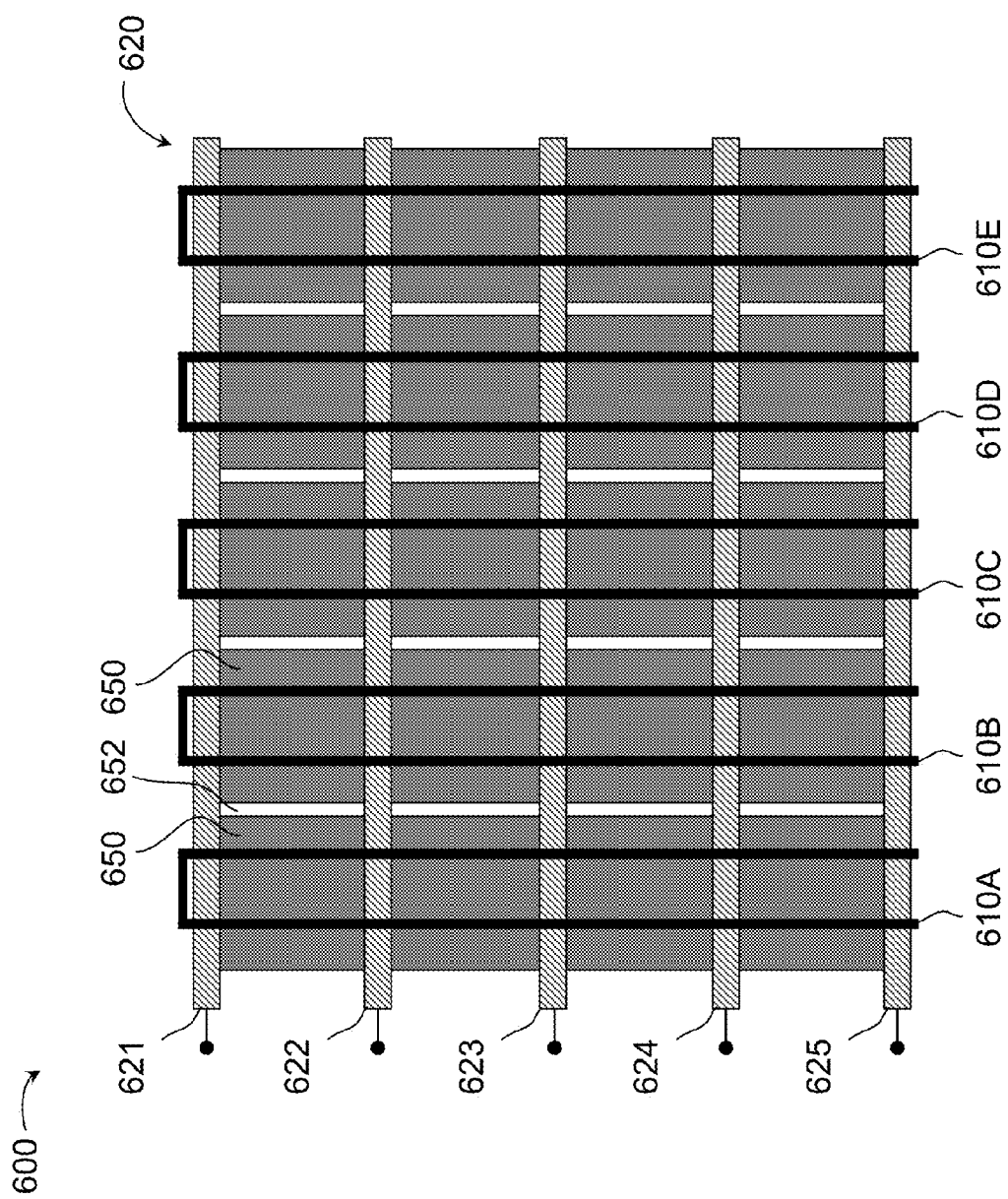
FIGS. 6-11 are conceptual diagrams depicting electrode configurations in accordance with various embodiments.

FIG. 6 depicts an electrode configuration 600 in accordance with one embodiment. In this configuration, transmitter electrode 620 comprises a plurality of vertical segments or "strips" 650 separated by gaps or openings 652. Transmitter electrode 620 includes a plurality of contacts 621-625 distributed vertically along segments 650, such that the contacts 621 are generally perpendicular to segments 650. In other embodiments, contacts 621 are not generally perpendicular to segments 650.

A plurality of receiver electrodes 610A-610E are also provided, each substantially coinciding with (or generally parallel to) a respective segment 650 of transmitter electrode 620. Receiver electrodes 610A-610E in this embodiment are on a separate layer (a "receiver layer") from transmitter electrode 620 (which is on a "transmitter layer"). In one embodiment, the transmitter layer and the receiver layer are separated by a core, with the transmitter layer provided below the receiver layer, thereby acting as a shield from possible noise sources from underneath the sensor device.

In the illustrated embodiment, transmitter electrode 620 comprises five vertical segments 650, five receiver electrodes 610, and five contacts 621-625; however, any number of transmitter electrodes, segments, and receiver electrodes may be employed in any particular embodiment.

One end of each contact 621-625 (e.g., the left end of each contact, in this illustration) is driven by a transmitter module. That is, transmitter module 402 of FIG. 1 is configured to drive contacts 621-625 of transmitter electrode 620 to produce corresponding voltage gradients along segments 650. For example, in the illustration, four voltage gradients may be produced: between contacts 621 and 622, between contacts 622 and 623, and between contacts 624 and 625. In general, due to the very low resistivity of contacts 621-625, the produced voltage gradients will be substantially the same across all strips 650.

In one embodiment, each of the contacts 621-625 are driven by the transmitter module such that, at any particular time, each exhibits a voltage selected from one of a finite number of states. In one embodiment, for example, each contact 621-625 can be in one of four states: grounded (V=0), excited to a positive potential (V=1), excited to a negative potential (V=−1), or floating (Q=0). Further details regarding an exemplary method of driving contacts 621-625 are provided below.

Receiver module 406 of FIG. 1 is configured to receive, with receiver electrodes 610A-601E, a plurality of corresponding resulting signals (e.g., five resulting signals). Using these resulting signals, determination module 408 of FIG. 1 then determines positional information for an input object located within the sensing region—e.g., by determining a two-dimensional capacitive image based on the resulting signals.

The illustrated embodiment may be employed to provide "multi-scale" sensing. That is, receiver electrodes 610 may be used to receive resulting signals comprising effects of a voltage gradient that spans the length of multiple contacts (not just adjacent contacts), if desired. For example, contacts 621 and 623 may be driven to produce a voltage gradient spanning the length of transmitter electrode 620 between contacts 621 and 623. This voltage gradient will then produce a resulting signal that can be sensed by one or more of the receiver electrodes 610.

Figure 12:
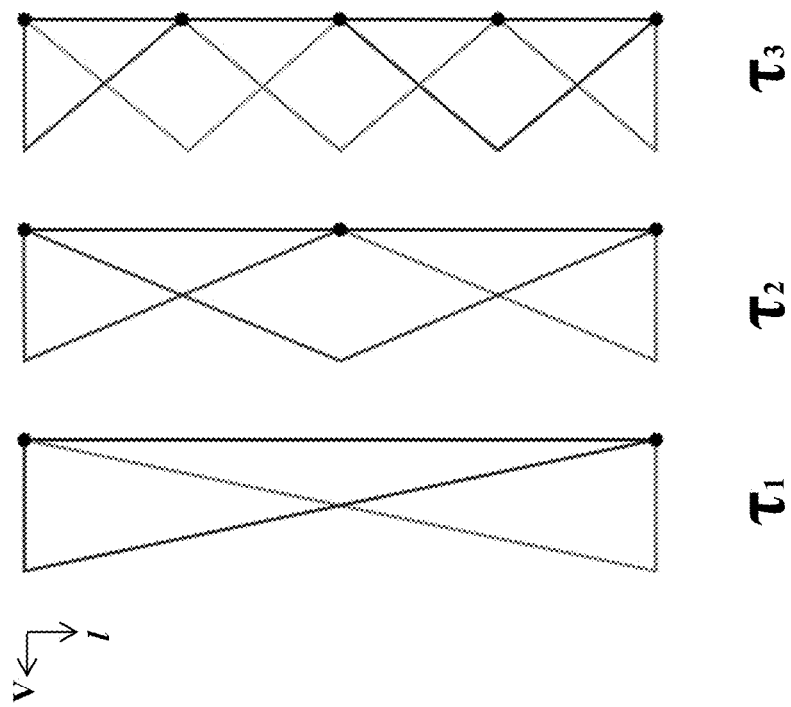
FIG. 12 is a graphical depiction of exemplary drive meshes useful in describing various embodiments.

Referring now to the graph depicted in FIG. 12, in combination with FIG. 6, a method of driving contacts such as contacts 621-625 will now be described. First, let $N_{tx}$ be the number of transmitter contacts Tx used in connection with a transmitter electrode, wherein, for example, contact 621 in FIG. 6 corresponds to $Tx_1$, contact 622 corresponds to $Tx_2$, and so on, up to $Tx_{N_{tx}}$. What is then illustrated in FIG. 12 are $N_{tx}$ drive "meshes" $\tau_1, \ldots, \tau_{N_{tx}}$, where $\tau_1$ is the coarsest mesh, and $\tau_{N_{tx}}$ is the finest mesh. The vertical axis in FIG. 12 corresponds to a length/along an electrode, the horizontal axis corresponds to a voltage or excitation level (increasing to the left), and the filled circles correspond to contact nodes.

The coarsest driving mesh $\tau_1$ is defined by two time steps: in the first time step, the first contact $Tx_1$ is excited by the potential V=1 and the last contact $Tx_{N_{tx}}$ is grounded (V=0). All other intervening contacts are set to a floating state (Q=0). In the next time step, $Tx_1$ is grounded and $Tx_{N_{tx}}$ is driven with potential V=1, while all other contacts remain floating. This defines two voltage gradients vertically along transmitter electrode 620. It will be appreciated that there are two degrees of freedom associated with $\tau_1$: the first and the last driving electrode. Each degree of freedom is symbolically displayed by a node (small filled circle) in FIG. 12.

Driving mesh $\tau_2$ is defined by three time steps: initially, $Tx_1$ is excited to potential V=1, both of the contacts $Tx_{\lfloor N_{tx}/2 \rfloor}$ and $Tx_{N_{tx}}$ are grounded, and all other contacts remain floating. Note that it is not necessary that $N_{tx}$ be an even number. Indeed, the elements of the mesh do not need to be equidistant. In the next time step, $Tx_{N_{tx}}$ is excited with potential V=1, $Tx_1$ and $Tx_{\lfloor N_{tx}/2 \rfloor}$ are grounded, and all other contacts remain floating. Finally, in the third time step that completes the $\tau_2$-driving cycle, $Tx_{\lfloor N_{tx}/2 \rfloor}$ is driven with potential V=1, $Tx_1$ and $Tx_{N_{tx}}$ are grounded, and all other contacts are floating.

Similarly, driving mesh $\tau_3$ is defined by five time steps: in addition to the degrees of freedom defined on $\tau_2$, the contacts that lie closest to the centers of ($Tx_1$, $Tx_{\lfloor N_{tx}/2 \rfloor}$) and ($Tx_{\lfloor N_{tx}/2 \rfloor}$, $Tx_{N_{tx}}$) are employed by the driving scheme. At any of the five steps, only one of the nodes is driven, while all other nodes remain grounded. The contacts that are not part of the mesh remain floating.

In light of the foregoing, it is clear how each driving mesh $\tau_i$, i∈{1, 2, ..., $N_{tx}$} is defined. Specifically, each driving mesh consists of $2^{i-1}+1$ active (non-grounded) contacts that are as evenly distributed as possible. All contacts that do not belong to the mesh are floating. The mesh $\tau_i$ is fully defined after $2^{i-1}+1$ excitation steps. At each step, only one of the nodes is driven with potential V=1, while all other nodes are grounded. A contact that is active and once driven with potential V=1 is not driven again with potential V=1 during that excitation cycle. An excitation cycle is the set of all $2^{i-1}+1$ time steps that uniquely define the finite element mesh $\tau_i$.

Figure 7:
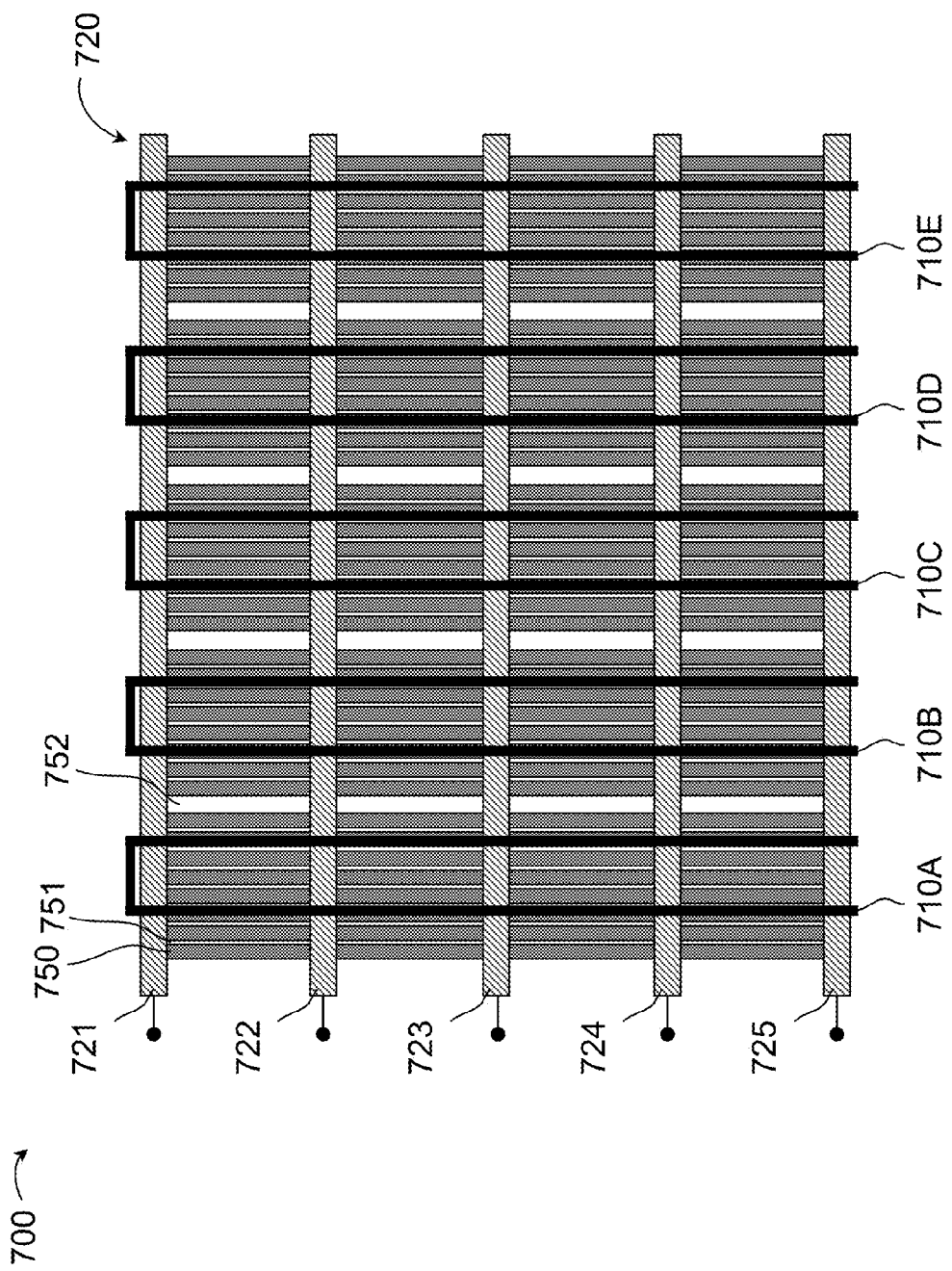

FIG. 7 depicts an electrode configuration 700 in accordance with an another embodiment, which generally includes receiver electrodes 710A-710E and a transmitter electrode 720 having a plurality of contacts 721-725. In this configuration, transmitter electrode 720 includes a number of thin vertical segments 750 separated by gaps 751. Each set of thin vertical segments 750 is further separated from the adjacent set by a gap 752. Stated another way, relative to the embodiment shown in FIG. 6, each of the wide segments 650 of transmitter electrode 620 have been replaced by a number (in this case, eight) parallel strips 750. This thin-strip configuration helps to increase the resistance of transmitter electrode 720. That is, the resistivity of transmitter electrode 720 is a function of the resistivity of the material or materials used for transmitter electrode 720 as well as the width of each segment 750.

Figure 8:
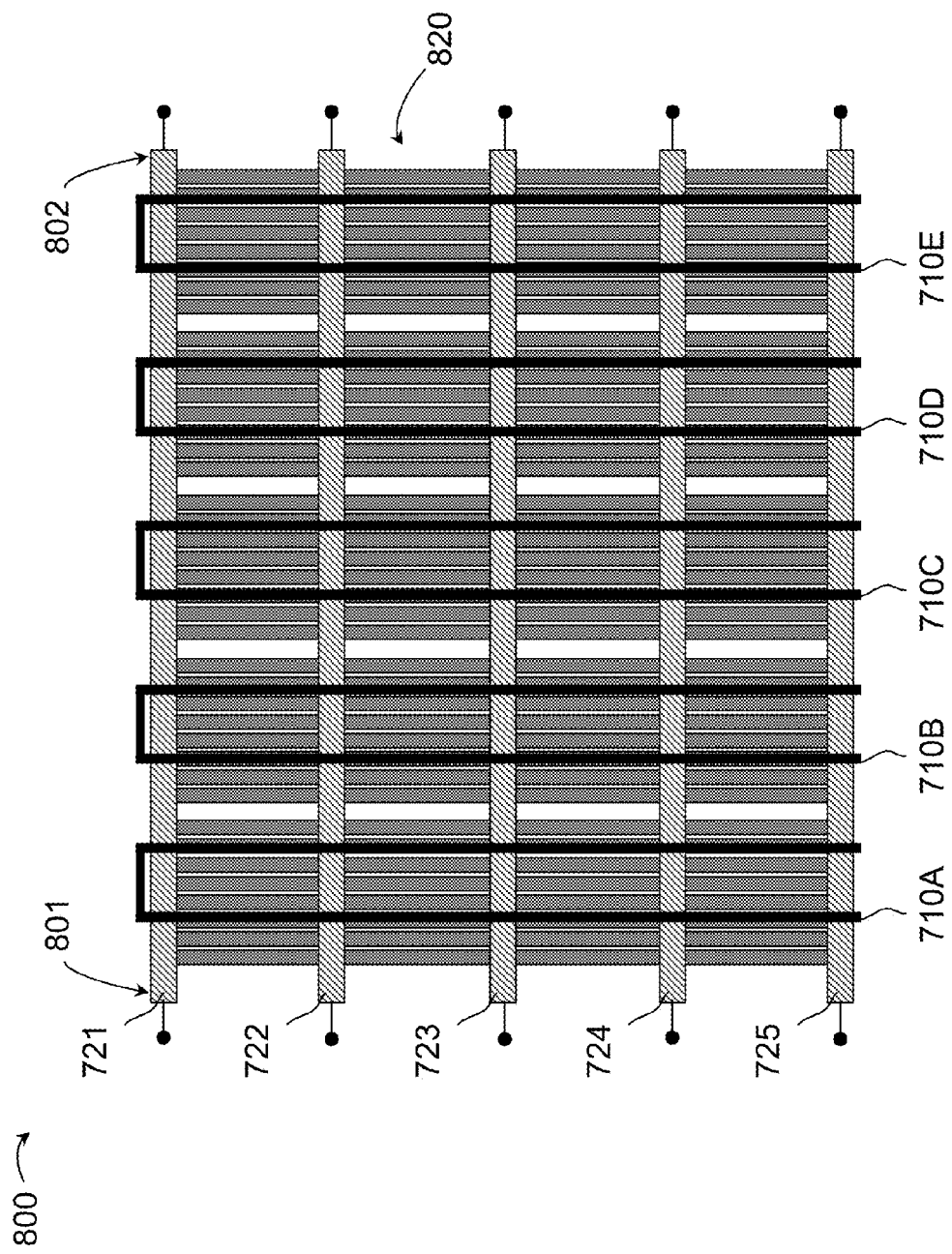

FIG. 8 depicts an electrode configuration 800 in accordance with another embodiment, which generally includes receiver electrodes 710A-710E and a transmitter electrode 820 having a plurality of contacts 721-725. In this embodiment, both ends of each contact 721-725 is driven by the transmitter module, and each contact 721 is contiguous horizontally. In an alternate embodiment, however, each contact 721, 722, etc. is discontinuous (e.g., in the center of the contact), thereby forming two parallel columns of contacts.

Figure 9:
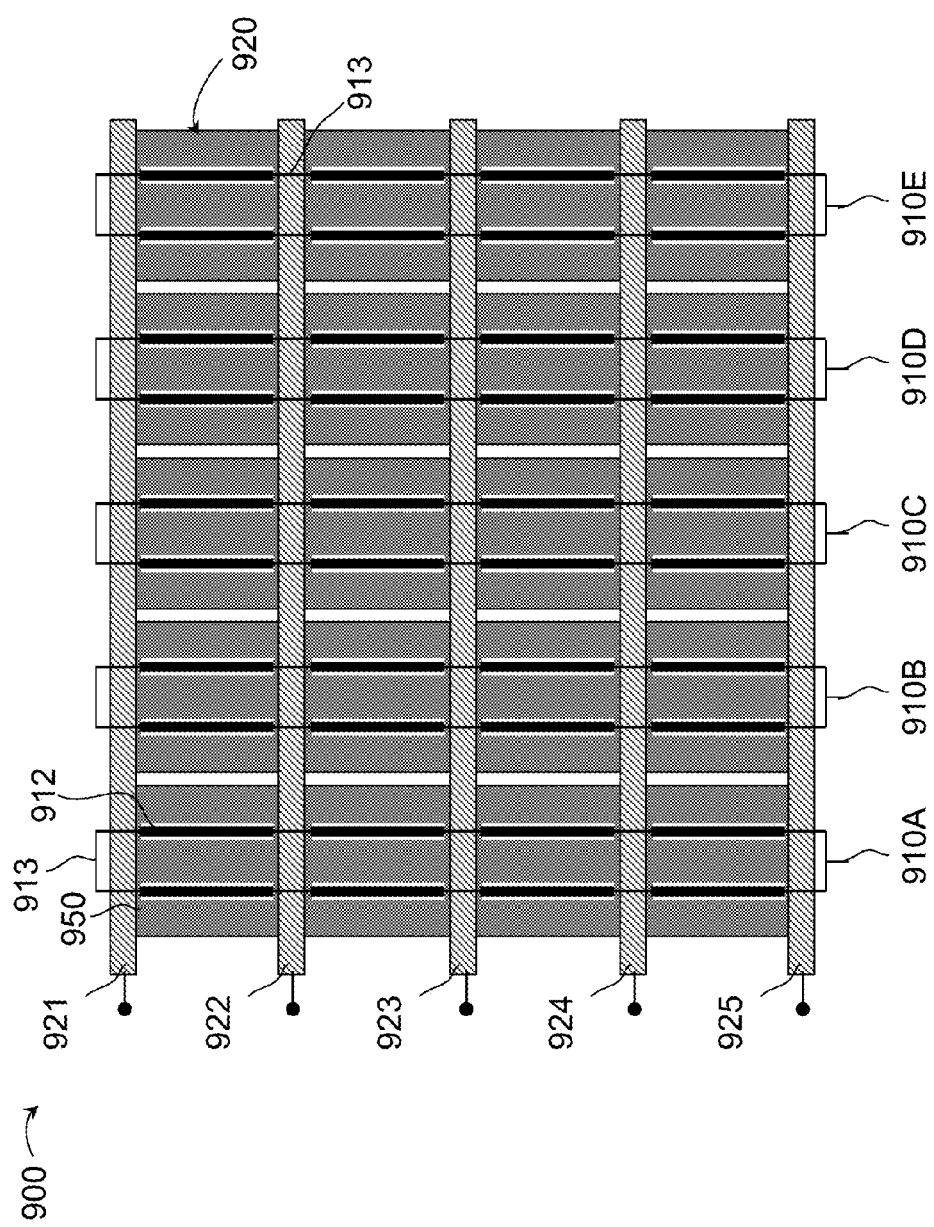

FIG. 9 depicts an electrode configuration 900 in accordance with another embodiment, which generally includes receiver electrodes 910A-910E and a transmitter electrode 920 having a plurality of contacts 921-925. In this embodiment, transmitter electrode 920 comprises a number of segments 950 as in previous embodiments; however, receiver electrodes 910 in this embodiment are formed within the gaps between segments 950 and are interconnected by jumpers within a jumper layer (or other such interconnect structures) 913. This configuration can be formed as a one-layer structure (or a 1.5-layer structure, if the jumper layer is considered to be a half layer).

Figure 10:
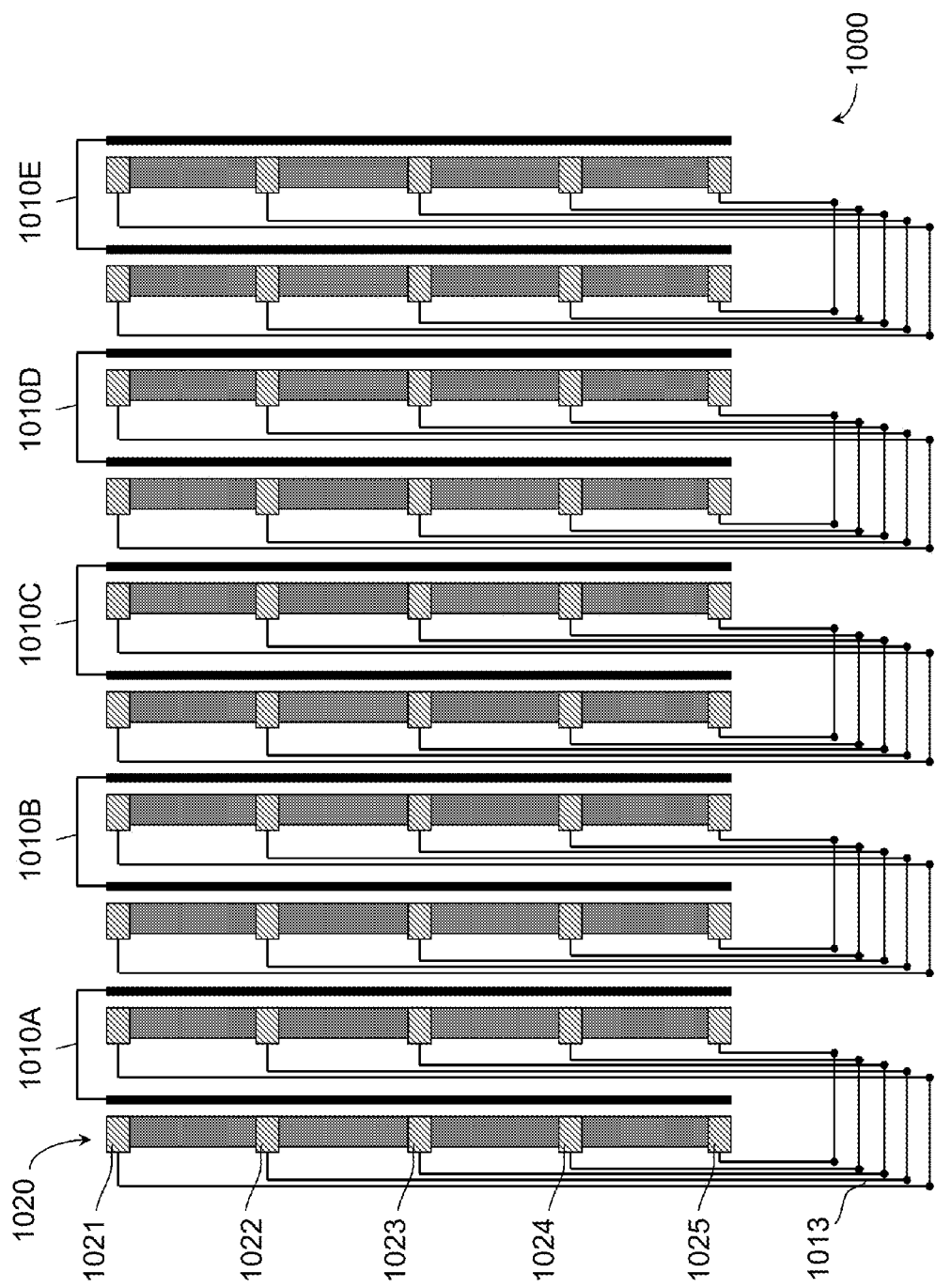

FIG. 10 depicts an electrode configuration 1000 in accordance with another embodiment, which generally includes receiver electrodes 1010A-1010E and transmitter electrodes 1020. Each transmitter electrode 1020 has a plurality of contacts 1021-1025. In this embodiment, adjacent transmitter electrodes 1020 are electrically interconnected, as shown, and correspond to a respective pair of receiver electrodes 1010 aligned substantially parallel with transmitter electrodes 1020. This is a transconductance-type configuration and can be formed as a one-layer structure. Note that there are no jumpers present in the sensing area. The respective horizontal contacts to 1021, 1022, ..., and 1025 might be electrically connected in a flex circuit. In this way, driving 1021 would excite the entire transmitter row. However, this is only one possible configuration. All transmitter contacts could be driven separately and be connected many different other ways. The more local structure (e.g., driving every contact separately) would require much more transmitter pins, but would reduce the low ground mass problem significantly. In other embodiments, transmitter electrodes 1020 are connected horizontally, although such a configuration might give undesirable low-ground-mass effects.

Figure 11:
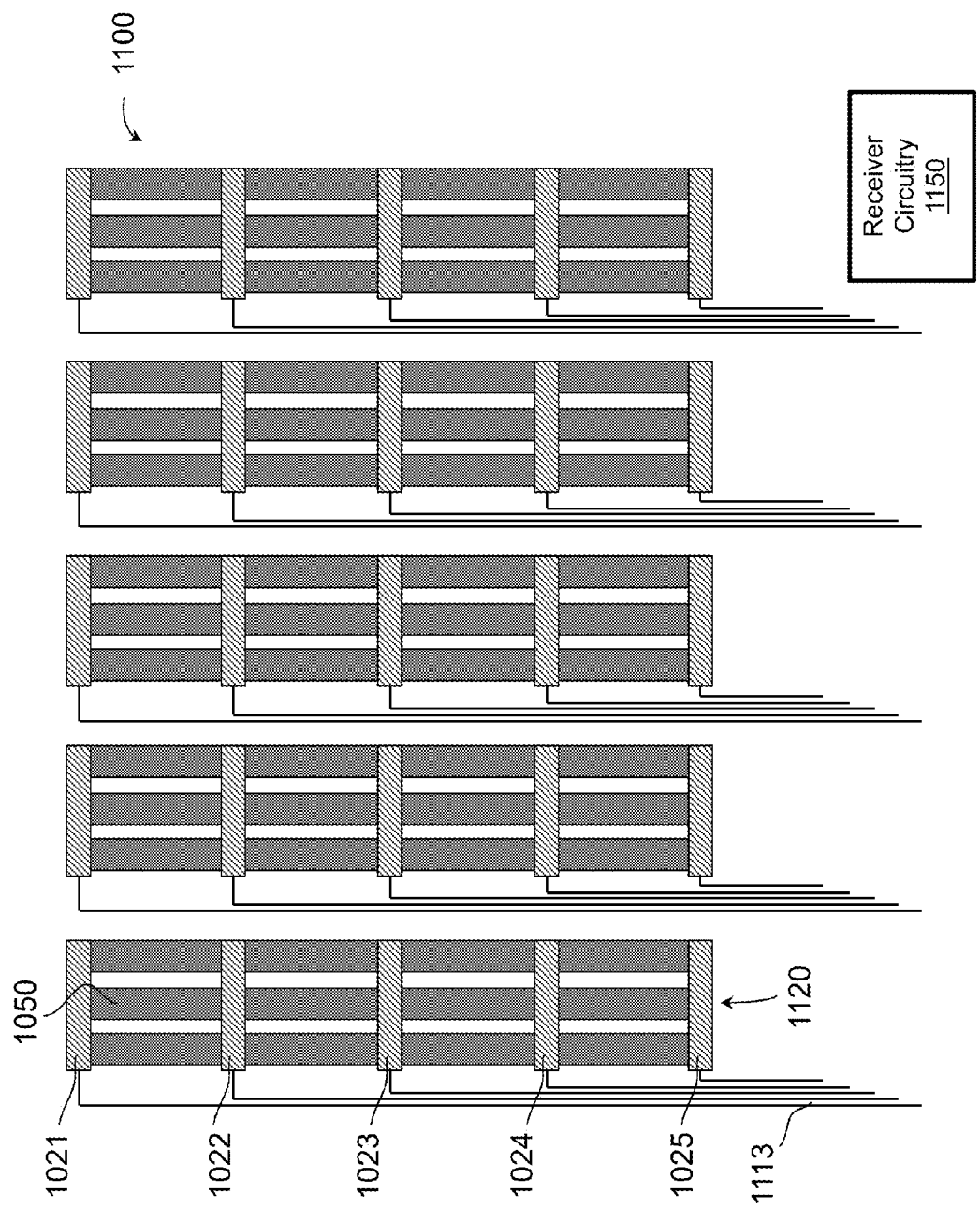

FIG. 11 depicts an electrode configuration 1100 in accordance with another embodiment. Unlike the transconductance sensor embodiments shown in FIGS. 6-10, this embodiment illustrates an absolute sensor embodiment, and thus does not require receiver electrodes of the type described above. Rather, each transmitter electrode 1120 has a plurality of contacts 1021-1025, each interconnected to external circuitry (not shown) via respective interconnects 1113. Each transmitter electrode 1120 comprises a plurality (e.g., three) vertical segments 1050. In other embodiments, fewer or greater vertical segments 1050 are used. Similarly, any number of contacts may be employed. In another embodiment, grounded lines are provided between each transmitter electrode 1120 to avoid undesirable interactions with the interconnects 1113. The illustrated traces can be connected to separate pins (expensive, but providing the best low-ground-mass performance) or can be connected in any desired order (e.g., all contacts could be connected horizontally, or any second horizontal contact could be connected to the same pin). In this embodiment, each transmitter electrode 1120 may also act as a receiver electrode (as is known in connection with absolute sensor devices) and communicate with receiver circuitry 1150. The receiver circuitry is then configured to receive resulting signals corresponding to the voltage gradients produced via transmitter electrodes 1120.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device, the processing system comprising:
    a transmitter module including transmitter circuitry, the transmitter module configured to drive a first contact, a second contact, and a third contact of a first transmitter electrode, wherein the first contact is disposed between the second contact and the third contact, and the transmitter module is configured to produce a first voltage gradient between the first contact and the second contact, the transmitter electrode comprising the first contact, the second contact, and the third contact, and to produce a second voltage gradient between the first contact and the third contact;
    a receiver module, the receiver module configured to receive, with a first receiver electrode, a first resulting signal comprising effects of the first voltage gradient, and to receive, with a second receiver electrode, a second resulting signal comprising effects of the second voltage gradient, wherein the first receiver electrode and the second receiver electrodes are distinct from the first contact, the second contact, and the third contact; and
    a determination module configured to determine positional information for a first input object located within a sensing region based on the first resulting signal and the second resulting signal.

2. The processing system of claim 1, wherein the first receiver electrode spans the distance between the first contact and the second contact.

3. The processing system of claim 1, wherein the first receiver electrode spans the distance between the second contact and the third contact.

4. The processing system of claim 1, wherein the first transmitter electrode comprises a resistive material.

5. The processing system of claim 1, wherein the transmitter electrode comprises a plurality of segments.

6. The processing system of claim 1, wherein the first, second, and third contacts have a sheet resistance that is lower than the sheet resistance of the first transmitter electrode.

7. The processing system of claim 1, wherein the input device is a transcapacitive sensor.

8. The processing system of claim 1, wherein the first transmitter electrode, the first receiver electrode, and the second receiver electrode are disposed within the same plane.

9. The processing system of claim 1, wherein the determination module is further configured to determine a two-dimensional capacitive image based on the first resulting signal and the second resulting signal.

10. The processing system of claim 1, wherein the transmitter module is further configured to drive the second contact to produce a third voltage gradient between the second contact and the third contact; the receiver module is configured to receive, with the first receiver electrode, a third resulting signal comprising effects of the third voltage gradient; and the determination module is configured to determine the positional information based in part on the third resulting signal.

11. The processing system of claim 1, wherein the receiver module is configured to receive, with the second receiver electrode, a fourth resulting signal comprising effects of the first voltage gradient; and the determination module is configured to determine the positional information based in part on the fourth resulting signal.

12. A finite element sensor device comprising:
    a first transmitter electrode comprising a first contact, a second contact, and a third contact, wherein the first contact is disposed between the second contact and the third contact;
    a first receiver electrode and a second receiver electrode, wherein the first receiver electrode and the second receiver electrodes are distinct from the first contact, the second contact, and the third contact; and
    a processing system communicatively coupled to the first transmitter electrode and the first and second receiver electrodes, the processing system configured to:
        drive the first contact, the second contact, and the third contact of the first transmitter electrode to produce a first voltage gradient between the first contact and the second contact and to produce a second voltage gradient between the first contact and the third contact;
        receive, with the first receiver electrode, a first resulting signal comprising effects of the first voltage gradient;
        receive, with the second receiver electrode, a second resulting signal comprising effects of the second voltage gradient; and
        determine positional information for a first input object located within a sensing region based on the first resulting signal and the second resulting signal.

13. The finite element sensor device of claim 12, wherein the transmitter electrode comprises a plurality of segments.

14. The finite element sensor device of claim 12, wherein the first, second, and third contacts have a sheet resistance that is lower than the sheet resistance of the first transmitter electrode.

15. The finite element sensor device of claim 12, wherein the first transmitter electrode, the first receiver electrode, and the second receiver electrode are disposed within the same plane.

16. The finite element sensor device of claim 12, wherein the processing system is further configured to determine a two-dimensional capacitive image based on the first resulting signal and the second resulting signal.

17. The finite element sensor device of claim 12, wherein the processing system is further configured to:
    drive the second contact to produce a third voltage gradient between the second contact and the third contact;
    receive, with the first receiver electrode, a third resulting signal comprising effects of the third voltage gradient; and
    determine the positional information based in part on the third resulting signal.

18. The finite element sensor device of claim 12, wherein the processing system is configured to:
    receive, with the second receiver electrode, a fourth resulting signal comprising effects of the first voltage gradient; and
    determine the positional information based in part on the fourth resulting signal.

19. A method of capacitive sensing, the method comprising:

driving a first contact, a second contact, and a third contact of a first transmitter electrode to produce a first voltage gradient between the first contact and the second contact and to produce a second voltage gradient between the first contact and the third contact, the transmitter electrode comprising the first contact, the second contact, and the third contact;

receiving, with a first receiver electrode, a first resulting signal comprising effects of the first voltage gradient;

receiving, with a second receiver electrode, a second resulting signal comprising effects of the second voltage gradient, wherein the first receiver electrode and the second receiver electrodes are distinct from the first contact, the second contact, and the third contact; and determining positional information for a first input object located within a sensing region based on the first resulting signal and the second resulting signal.

20. The method of claim 19, further including determining a two-dimensional capacitive image based on the first resulting signal and the second resulting signal.

21. The method of claim 19, further including:

driving the second contact to produce a third voltage gradient between the second contact and the third contact;

receiving, with the first receiver electrode, a third resulting signal comprising effects of the third voltage gradient; and determining the positional information based in part on the third resulting signal.

22. The method of claim 19, further including:

receiving, with the second receiver electrode, a fourth resulting signal comprising effects of the first voltage gradient; and determining the positional information based in part on the fourth resulting signal.

* * * * *